United States Patent
Das (10) Patent No.: US 10,662,794 B2
(45) Date of Patent: May 26, 2020

(54) STRIP SEAL AXIAL ASSEMBLY GROOVE

(71) Applicant: Rolls-Royce Corporation, Indianapolis, IN (US)

(72) Inventor: Sayon Das, Bangalore (IN)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 82 days.

(21) Appl. No.: 15/873,484

(22) Filed: Jan. 17, 2018

(65) Prior Publication Data

US 2019/0120072 A1 Apr. 25, 2019

(30) Foreign Application Priority Data

Oct. 19, 2017 (IN) .............................. 201711037133

(51) Int. Cl.
*F01D 11/00* (2006.01)
*F01D 11/12* (2006.01)

(52) U.S. Cl.
CPC .......... *F01D 11/001* (2013.01); *F01D 11/005* (2013.01); *F01D 11/12* (2013.01); *F05D 2230/60* (2013.01); *F05D 2250/11* (2013.01); *F05D 2250/12* (2013.01); *F05D 2250/13* (2013.01); *F05D 2250/131* (2013.01); *F05D 2260/30* (2013.01)

(58) Field of Classification Search
CPC .... F01D 11/003; F01D 11/005; F01D 11/001; F01D 11/08; F01D 9/02; F01D 9/04; F01D 25/246; F01D 25/243; F05D 2230/60; F05D 2240/11
See application file for complete search history.

(56) References Cited

U.S. PATENT DOCUMENTS

| | | | |
|---|---|---|---|
| 4,537,024 A | 8/1985 | Grosjean | |
| 5,074,748 A | 12/1991 | Hagle | |
| 5,088,888 A | 2/1992 | Bobo | |
| 5,154,577 A | 10/1992 | Kellock et al. | |
| 5,188,507 A * | 2/1993 | Sweeney | B23H 9/10 415/170.1 |
| 5,249,920 A | 10/1993 | Shepherd et al. | |
| 5,655,876 A * | 8/1997 | Rock | F01D 9/041 415/138 |
| 5,971,703 A * | 10/1999 | Bouchard | F01D 25/246 415/135 |
| 5,997,247 A * | 12/1999 | Arraitz | F01D 11/005 277/543 |
| 7,186,078 B2 * | 3/2007 | Tanaka | F01D 5/225 415/170.1 |

(Continued)

*Primary Examiner* — Dwayne J White
*Assistant Examiner* — Wesley Le Fisher
(74) *Attorney, Agent, or Firm* — Brinks Gilson & Lione (57) ABSTRACT

Systems and methods for reducing heat exposure of a turbine casing in a gas turbine engine may be provided. The system may include blade track segments. The blade track segments may include a cavity formed at a circumferential end of the blade track segment. The blade track segments may further include an assembly groove configured to provide a clearance for axial insertion of an inter-segment strip seal. An inter-segment strip seal may be axially inserted past the assembly grooves and into the cavity. The inter-segment strip seal may cover a gap between adjacent blade track segments, thus blocking hot, high pressure fluid from contacting the turbine casing.

18 Claims, 7 Drawing Sheets

(56) References Cited

U.S. PATENT DOCUMENTS

| | | | |
|---|---|---|---|
| 7,201,559 B2* | 4/2007 | Gendraud | F01D 11/005 |
| | | | 277/641 |
| 7,261,514 B2 | 8/2007 | London et al. | |
| 7,901,186 B2 | 3/2011 | Cornett et al. | |
| 2007/0104571 A1* | 5/2007 | Drerup | F01D 11/005 |
| | | | 415/191 |
| 2007/0140843 A1* | 6/2007 | Drerup | F01D 9/041 |
| | | | 415/209.3 |
| 2011/0044801 A1* | 2/2011 | Di Paola | F01D 9/04 |
| | | | 415/173.1 |
| 2011/0081237 A1 | 4/2011 | Durocher et al. | |
| 2013/0115065 A1* | 5/2013 | Correia | F01D 11/005 |
| | | | 415/182.1 |
| 2016/0298480 A1* | 10/2016 | Bluck | F01D 11/006 |

* cited by examiner

STRIP SEAL AXIAL ASSEMBLY GROOVE

The present application claims priority under 35 U.S.C. § 119 to India Patent Application No. 201711037133, filed Oct. 19, 2017.

TECHNICAL FIELD

This disclosure relates to gas turbine engines and, in particular, to axial heat shield inserts.

BACKGROUND

In a gas turbine engine, a gap is typically left between adjacent blade track segments. The gap allows the blade track segments to thermally expand during operation of the gas turbine engine without causing damage by the blade track segments coming into contact with each other.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

A gap is typically left between blade track segments in a gas turbine engine because the gap may decrease a risk that the blade track segments contact each other during operation of the gas turbine engine. However, heat from hot fluid flowing through blades located radially inward of the blade track segments may pass radially outward through the gap and reach a turbine casing located radially outward of the blade track segments.

By way of an introductory example, a system for reducing heat exposure of the turbine casing in a gas turbine engine may be provided. The system may include an inter-segment seal strip positioned between blade track segments, a gap defined by a circumferential end of a first blade track segment and a circumferential end of a second blade track segment, adjacent to the first blade track segment. A clip may couple the blade track segments to the turbine casing.

One interesting feature of the systems and methods described below may be that the gap being sealed may reduce a temperature in portions of the gas turbine engine located radially outward from an axis of rotation of the turbine during operation of the gas turbine engine compared to the temperatures in these portions if the gap was not sealed. Alternatively, or in addition, an interesting feature of the systems and methods described below may be that the reduced temperatures at portions of the gas turbine engine may increase a lifespan of one or more components located in the portions, thus reducing replacement or maintenance costs. Alternatively or in addition, an interesting feature of the systems and methods described below may be that the materials typically used for relevant components may be replaced by less expensive alternative materials as a result of the components having reduced exposure to high temperatures.

Figure 1:
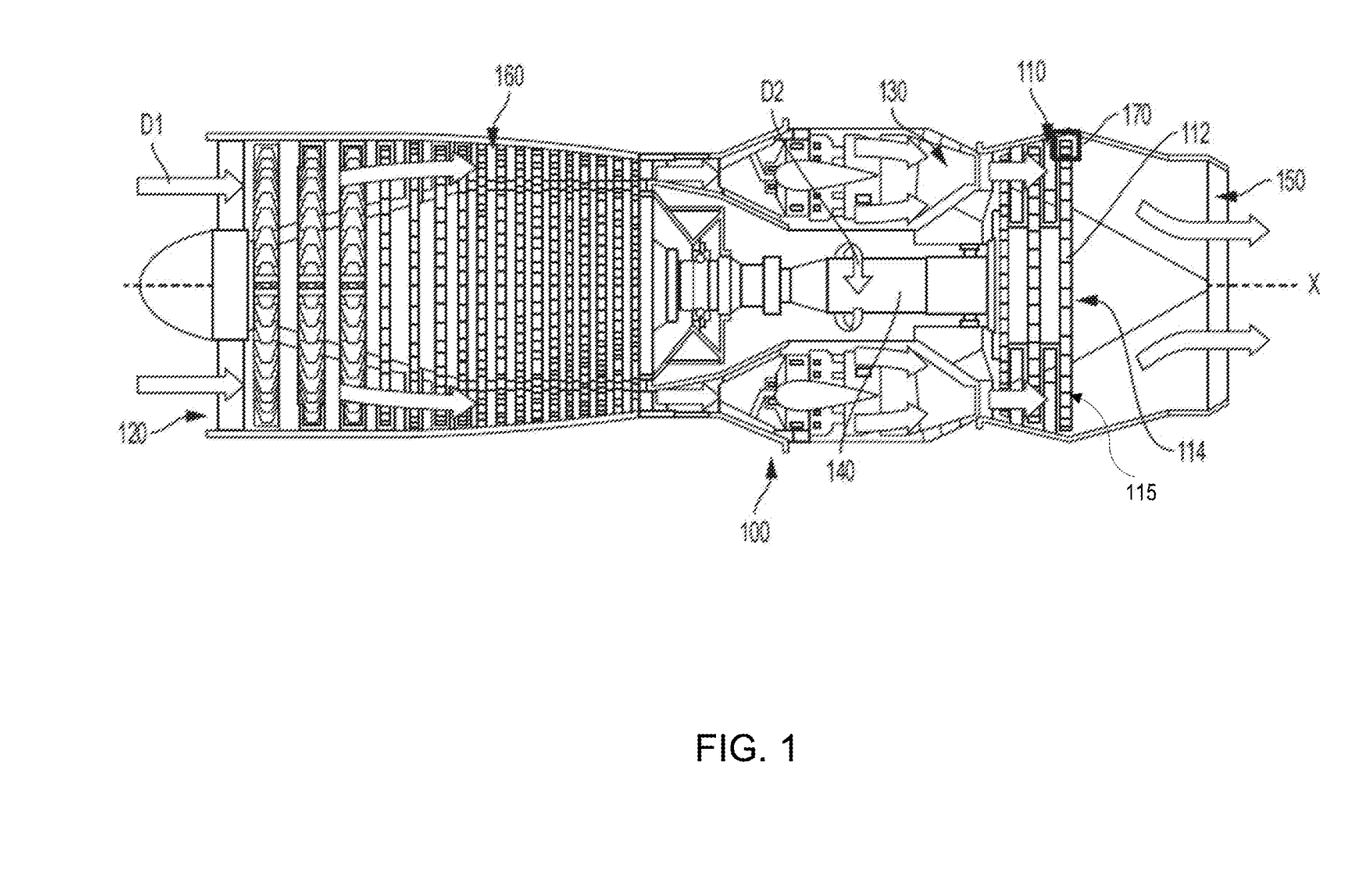
FIG. 1 illustrates a cross-sectional view of an example of a gas turbine engine.
Figure 3:
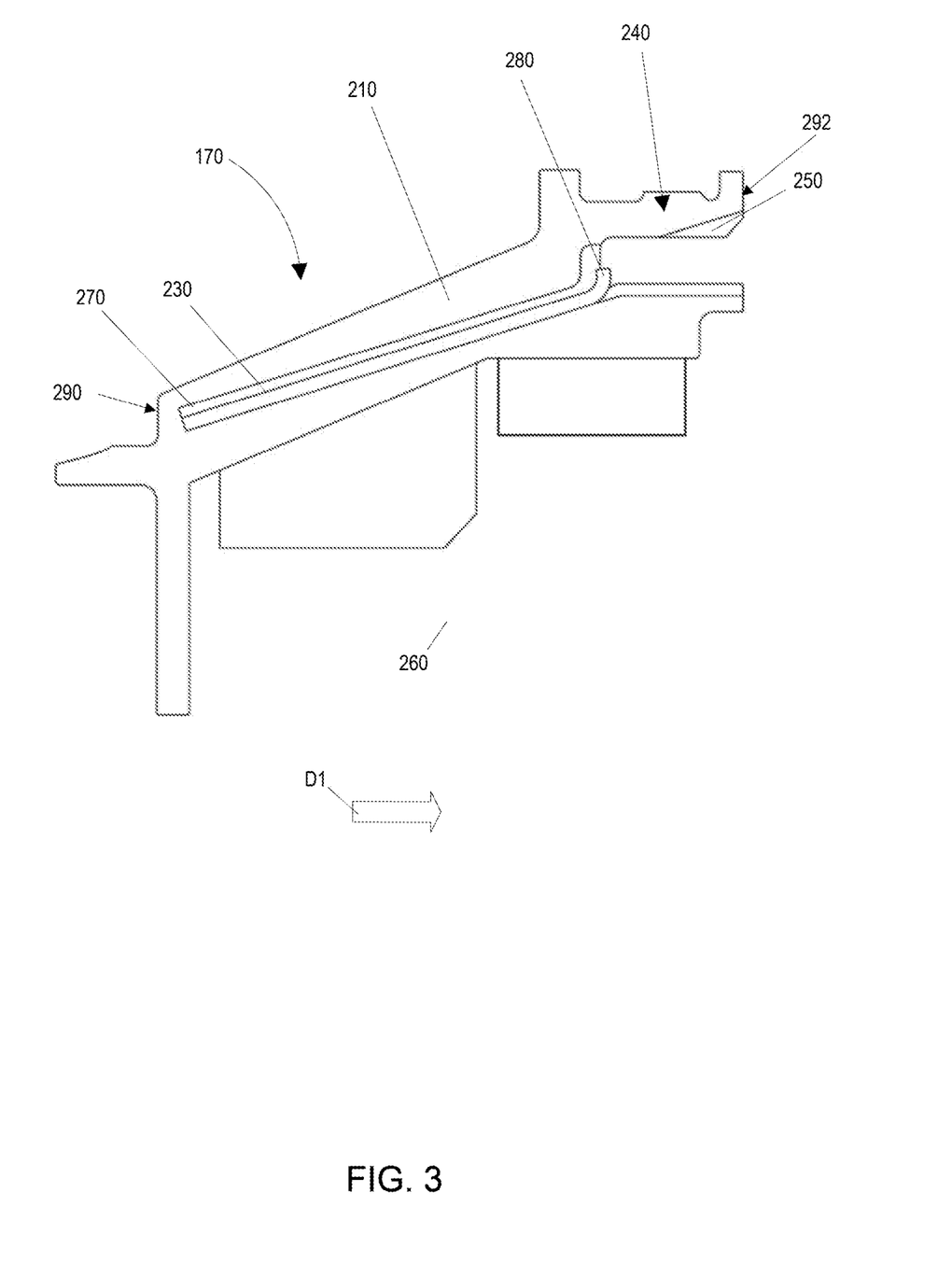
FIG. 3 illustrates a first cross-sectional view of a heat shield portion of the gas turbine engine.

FIG. 1 illustrates a cross-sectional view of a gas turbine engine 100 identifying a location of a heat shield portion 170 of the gas turbine engine 100 that is shown in more detail in FIG. 3. The gas turbine engine 100 may be for propulsion of, for example, an aircraft. Alternatively or in addition, the gas turbine engine 100 may be used to drive a propeller in aquatic applications, or to drive a generator in energy applications. The gas turbine engine 100 may include an intake section 120, a compressor section 160, a combustion section 130, a turbine section 110, and an exhaust section 150. During operation of the gas turbine engine 100, fluid received from the intake section 120, such as air, travels along the axial direction D1 and may be compressed within the compressor section 160. The compressed fluid may then be mixed with fuel and the mixture may be burned in the combustion section 130. The axial direction D1 may be the direction of fluid flow during operation of the gas turbine engine 100. The combustion section 130 may include any suitable fuel injection and combustion mechanisms. The hot, high pressure fluid may then pass through the turbine section 110 to extract energy from the fluid and cause a turbine shaft of a turbine 114 in the turbine section 110 to rotate, which in turn drives the compressor section 160. Discharge fluid may exit the exhaust section 150.

As noted above, the hot, high pressure fluid may pass through the turbine section 110 during operation of the gas turbine engine 100. As the fluid flows through the turbine section 110, the fluid may pass through a blade assembly 115, specifically between adjacent blades 112 included in the blade assembly 115, coupled to the turbine 114 causing the turbine 114 to rotate. The rotating turbine 114 may turn a shaft 140 in a first rotational direction D2, for example. The blades 112 may rotate around an axis of rotation, which may correspond to a centerline X of the turbine 114 in some examples. The blade assembly 115 may include, for example, an arrangement of the blades 112 in the turbine section 110 of the gas turbine engine 100.

As the hot, high pressure fluid passes through the turbine section 110, heat from the fluid is transferred to components of the turbine section 110. Examples of components that receive heat from the hot, high pressure fluid may include the heat shield portion 170.

Figure 2:
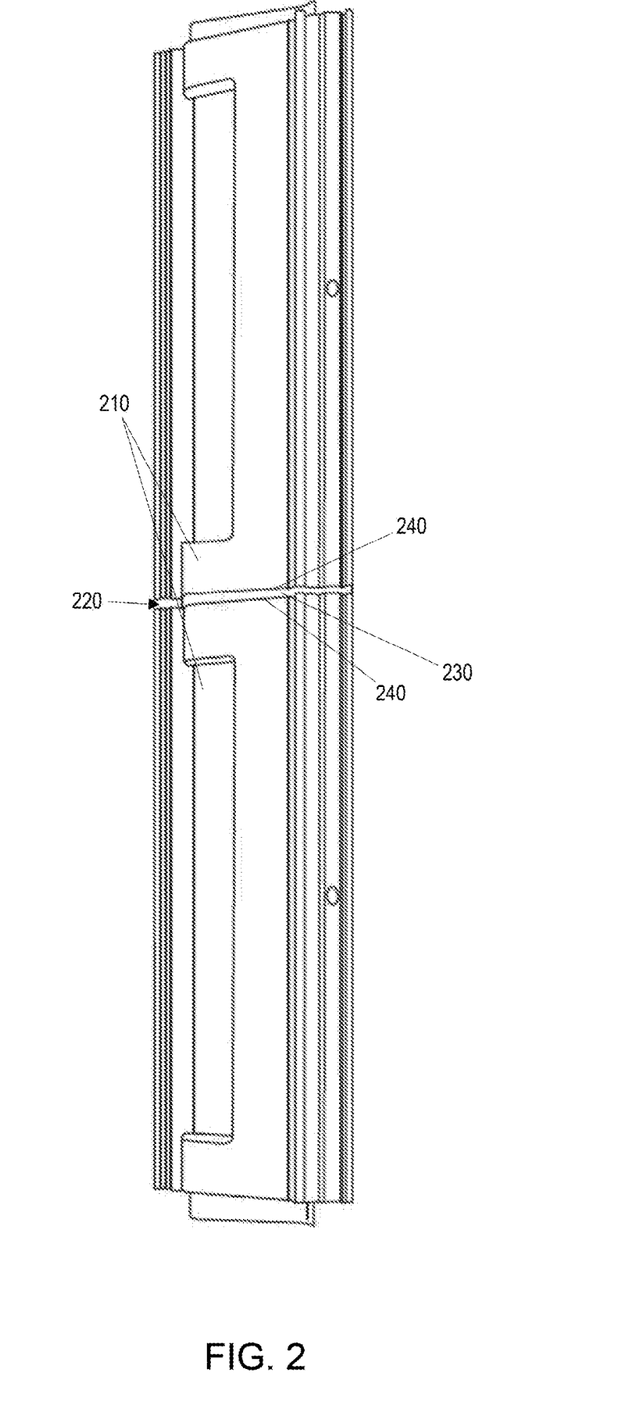
FIG. 2 illustrates a top view of a pair of blade track segments.

FIG. 2 shows a top view of blade track segments 210. The blade track segments 210 may be included in the heat shield portion 170 of the gas turbine engine 100. A gap 220 may be situated between adjacent blade track segments 210. An inter-segment strip seal 230 may be positioned to span between adjacent blade track segments 210 and cover the gap 220. The blade track segments 210 may include a circumferential end 240. The circumferential end 240 may be an end of the blade track segments 210 which at least partially defines the gap 220. Though FIG. 2 shows only a pair of blade track segments 210, more blade track segments 210 are possible with gaps 220 separating each of the blade track segments 210. In some examples, three, four, or more blade track segments 210 may be present. The blade track segments 210 may be arranged around the axis of rotation of the turbine 114, which may correspond to the centerline X of the turbine 114.

The gap 220 may be a space between adjacent blade track segments 210 into which the blade track segments 210 may expand if heated. Alternatively or in addition, the gap 220 may allow thermal expansion of the blade track segments 210 during operation of the gas turbine engine 100 and is a means to avoid damaging components of the gas turbine engine 100.

FIG. 3 shows a cross-sectional view of the heat shield portion 170 of the gas turbine engine 100. The heat shield portion 170 may include at least one of the blade track segments 210, an inter-segment strip seal 230, a cavity 270, and an assembly groove 250 formed into the circumferential end 240 of the blade track 210.

The blade track segments 210 may include a track that guides the blades 112 as the blades 112 rotate within the turbine section 110. The blade track segments 210 may include an indentation or recess that allows insertion of a tip of the blade 112. Thus inserted, the tip of the blade 112 may limit or block fluid in a fluid flow channel 260 from travelling over the tip of the blade 112. Alternatively or in addition, as a result of the blade tip inserted into the blade track segment 210, fluid in the fluid flow channel 260 may be directed to flow around a portion of the blade 112 that results in the blade 112 rotating around the turbine 114. Alternatively or in addition, the circumferential end 240 of the blade track 210 may partially define the cavity 270. The inter-segment strip seal 230 may be positioned within and/or inserted into the cavity 270.

The inter-segment strip seal 230 may be a component spanning between adjacent blade track segments 210. During operation of the gas turbine engine 100, the inter-segment strip seal 230 may prevent hot, high pressure fluid from leaking through the gap 220 and contacting other components of the gas turbine engine 100 that may be susceptible to damage from exposure to heat or high pressure. The inter-segment strip seal 230 may be assembled axially, fitting into the cavity 270 and spanning the gap 220 from one blade track segment 210 to another blade track segment 210. Examples of inter-segment strip seals 230 may comprise sheet metal or ceramic matrix composite material. Examples of suitable materials may include nickel alloys such as Hastalloy X material, Rene41, any suitable nickel alloy, any material that may resist hot gas temperatures, or combinations thereof. In some examples, the inter-segment strip seal 230 may include wear resistant material.

The blade track segment 210 may include the assembly groove 250. The assembly groove 250 may be a clearance located at a front end 290, a rear end 292, or both ends 290, 292 of the blade track segment 210. Alternatively or in addition, the assembly groove 250 may be a portion of the blade track segment 210 that is removed to provide a clearance and to allow for axial installation of the inter-segment strip seal 230 into the cavity 270. If the assembly groove 250 were not present, then the inter-segment strip seal 230 may interfere with or strike the blade track segment 210 during axial installation of the inter-segment strip seal 230. To overcome the interference that would otherwise occur, the assembly groove 250 is made in the blade track segment 210. The assembly groove 250 may be positioned at the front end 290 of the blade trade segments 210 or at the rear end 292 of the blade trade segment 210. The front end 290 may be an end of the blade track segment 210 that faces the intake section 120. The rear end 292 may be an end of the blade track segment 210 that faces the exhaust section 150. In some examples, the assembly groove 250 of adjacent blade track segments 210 may be aligned and the cavity 270 of adjacent blade track segments 210 may be aligned, thus allowing easier axial insertion of the inter-segment strip seal 230 into the cavities 270. In some examples, multiple assembly grooves 250 are located on a single and/or multiple blade track segments 210.

The assembly groove 250 may have a cross-section having any shape that accommodates the inter-segment strip seal 230. The cross-section of the assembly groove 250 may depend on the components or real-estate surrounding the assembly groove 250. In some examples, the cross-section of the assembly groove 250 may include polygonal shapes. Alternatively or in addition, the cross-section of the assembly groove 250 may include non-polygonal shapes. For example, the cross-section of the assembly groove 250 may have a rectangular, trapezoidal, triangular, or other polygonal shape. Alternatively or in addition, the cross-section of the assembly groove 250 may have a circular, oval, curved, or other non-polygonal shape.

During assembly of the heat shield portion 170 of the gas turbine engine 100, the inter-segment strip seal 230 may be installed by axially inserting the inter-segment strip seal 230. Axial installation of the inter-segment strip seal 230 refers to installing the inter-segment strip seal 230 into the cavity 270 in substantially the axial direction D1. Without the clearance provided by the assembly groove 250, the inter-segment strip seal 230 may require bending or warping in order to be axially inserted into the cavity 270. Bending or warping of the inter-segment strip seal 230 may result in permanently damaging the inter-segment strip seal 230 and thus may require repair or replacement. Alternatively or in addition, as a result of the inter-segment strip seal 230 being damaged, the inter-segment strip seal 230 may function improperly resulting in an increase in hot, high pressure fluid leakage, overheating of components of the gas turbine engine 100, and/or performance loss of the gas turbine engine 100. As such, the clearance provided by the assembly groove 250 may be particularly advantageous when the inter-segment strip seal 230 is installed axially into the cavity 270.

The fluid flow channel 260 may be a channel in which the hot, high pressure fluid flows during operation of the gas turbine engine 100. The fluid in the fluid flow channel 260 may flow in the axial direction D1 during operation of the gas turbine engine 100. The fluid in the fluid flow channel 260 may be transferred through the gap 220 and contact other components of the gas turbine engine 100 unless the gap is blocked, sealed, or otherwise closed, by the inter-segment strip seal 230 for example. The fluid flow channel 260 may be located in the turbine section 110, the intake section 120, the combustion section 130, the exhaust section 150, the compressor section 160, or combinations thereof.

The cavity 270 may be a recess formed at the circumferential end 240 of the blade track segment 210. The cavity 270 may have sufficient depth to allow the inter-segment strip seal 230 to be inserted therein, and may have additional space to allow the inter-segment strip seal 230 to thermally expand during operation of the gas turbine engine 100.

The inter-segment strip seal 230 may include a lip 280 at an end of the inter-segment strip seal 230. The lip 280 may extend from the end of the inter-segment strip seal 230. Alternatively or in addition, the lip 280 may be a means to ease removal of the inter-segment strip seal 230 from the cavity 270. The lip 280 may, for example, include a curved arc, a straight plane, or any form that may serve as a means to ease in the removal of inter-segment strip seal 230.

Figure 4:
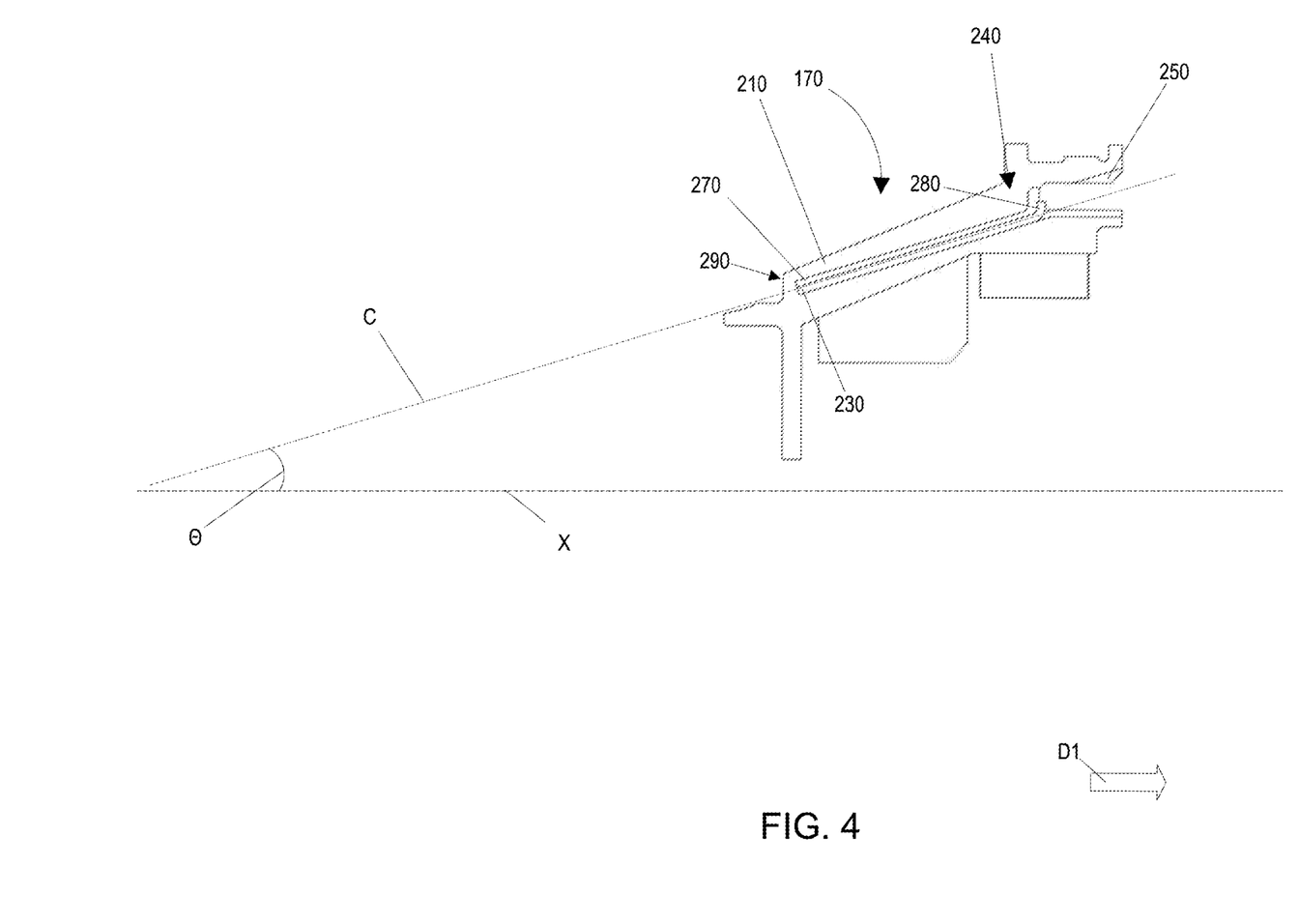
FIG. 4 illustrates a second cross-sectional view of the heat shield portion of the gas turbine engine.

FIG. 4 shows the same heat shield portion 170 as FIG. 3 with an angle Θ identified. The cavity 270 illustrated in FIG. 4 includes a centerline C running axially through the cavity 270. The center line C of the cavity 270 and the centerline X of the turbine 114 form the angle Θ. The angle Θ may be between 0° and 90°, inclusively, and may open toward the exhaust section 150. Alternatively or in addition, the angle Θ may be between 0° and 90°, inclusively, and open toward the intake section 120.

Figure 5:
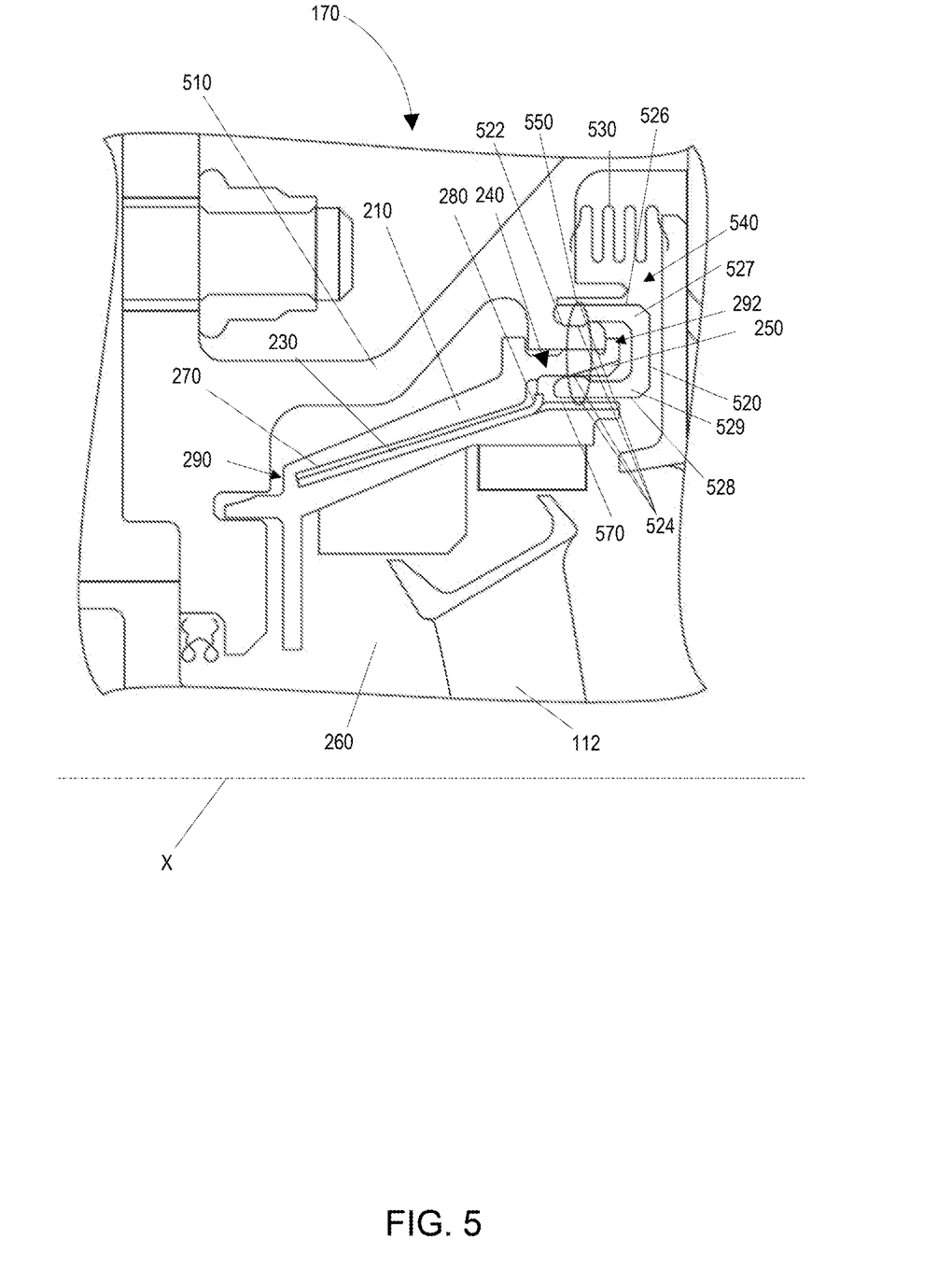
FIG. 5 illustrates a third cross-sectional view of the heat shield portion.

FIG. 5 shows a cross-sectional view of the heat shield portion 170 with additional features shown such as a turbine casing 510. In some examples, the blade track segments 210 may be coupled to a turbine casing 510, for example, by a clip 520. Alternatively or in addition, a W-seal 530 may be installed in a recess 540 to further prevent fluid from the fluid flow channel 260 from encountering the turbine casing 510. An anti-rotation pin 550 may be inserted into the clip 520 in order to hold the clip 520 in place.

The turbine casing 510 may be a structure that houses the turbine 114 and blades 112. The turbine casing 510 may include components that may be damaged from exposure to high temperatures or pressures. Therefore, the turbine casing 510 may benefit from less exposure to high temperature or high pressure environments. The inter-segment strip seal 230 assists in preventing hot, high temperature and pressure fluids in the fluid flow channel 260 from contacting the turbine casing 510. Examples of the turbine casing 510 may be metallic or ceramic matrix composite materials.

The clip 520 may be a component that assists in coupling the blade track segments 210 to the turbine casing 510. Alternatively or in addition, the clip 520 may assist in maintaining the inter-segment strip seal 230 in the cavity 270 during operation of the gas turbine engine 100. The shape of the clip 520 may be any suitable shape such that turbine casing 510 is coupled to the blade track segments 210. In some examples, the clip 520 is adjacent to the assembly groove 250. In some examples, the clip 520 may have a C-shape, as shown in FIG. 5. In some examples, the clip 520 may be brazed or welded to the turbine casing 510. Alternatively or in addition, the clip 520 may include a hook 522 that may couple the clip 520 and the turbine casing 510. The clip 520 may be made from various materials. Examples of suitable materials include nickel alloys such as Hastalloy X material, Rene41, any suitable nickel alloy, or combinations thereof. Alternatively or in addition, the clip 520 may include a plurality of clip slots 524. The clip slots 524 may be slots in the clip 520 sized to receive the anti-rotation pin 550. In some examples, the clip 520 may have clip slots 524 located at a first clip end 526 and a second clip end 528 of the clip 520, as shown in FIG. 5. The clip slots 524 may be sized such that the anti-rotation pin 550 may penetrate the clip 520 at the first clip end 526 and emerge from the second clip end 528. In some examples, the clip 520 may have a first portion 527 including the first end 526 and a second portion 529 including the second end 528. In some examples, the first portion 527 may be positioned further from the centerline X than the second portion 529. Alternatively or in addition, the first portion 527 may be further from the centerline X than the assembly groove 250. Alternatively or in addition, the second portion 529 may be closer to the centerline X than the assembly groove 250. Alternatively or in addition, the clip 520 may partially or completely surround the assembly groove 250.

The hook 522 may be a component of the clip 520 that couples the clip 520 to the turbine casing 510. Alternatively or in addition, the hook 522 may be a claw or tooth of the clip 520 that may couple the clip 520 with the turbine casing 510. In some examples, the hook 522 may be brazed or welded to the turbine casing 510. In some examples, the hook 522 may be removeably attached to the turbine casing 510. In some examples, the clip 520 may be inhibited from moving as a result of the hook 522 coupled to the turbine casing 510.

The W-seal seal 530 may be included in the recess 540. Hot fluid from the fluid flow channel 260 may unintentionally leak into recess 540. The W-seal 530 may be a structure that inhibits hot fluid from the fluid flow channel 260 from contacting the turbine casing 510. Examples of the W-seal 530 may be curved materials capable of absorbing heat without significant deformations.

The anti-rotation pin 550 may be a bar or shaft that may inhibit movement of the clip 520. Alternatively or in addition, the anti-rotation pin 550 may assert pressure onto a surface 570 of the blade track segment 210. Alternatively or in addition, the anti-rotation pin 550 may be inserted into the clip slots 524 to maintain the clip 520 in place.

Figure 6:
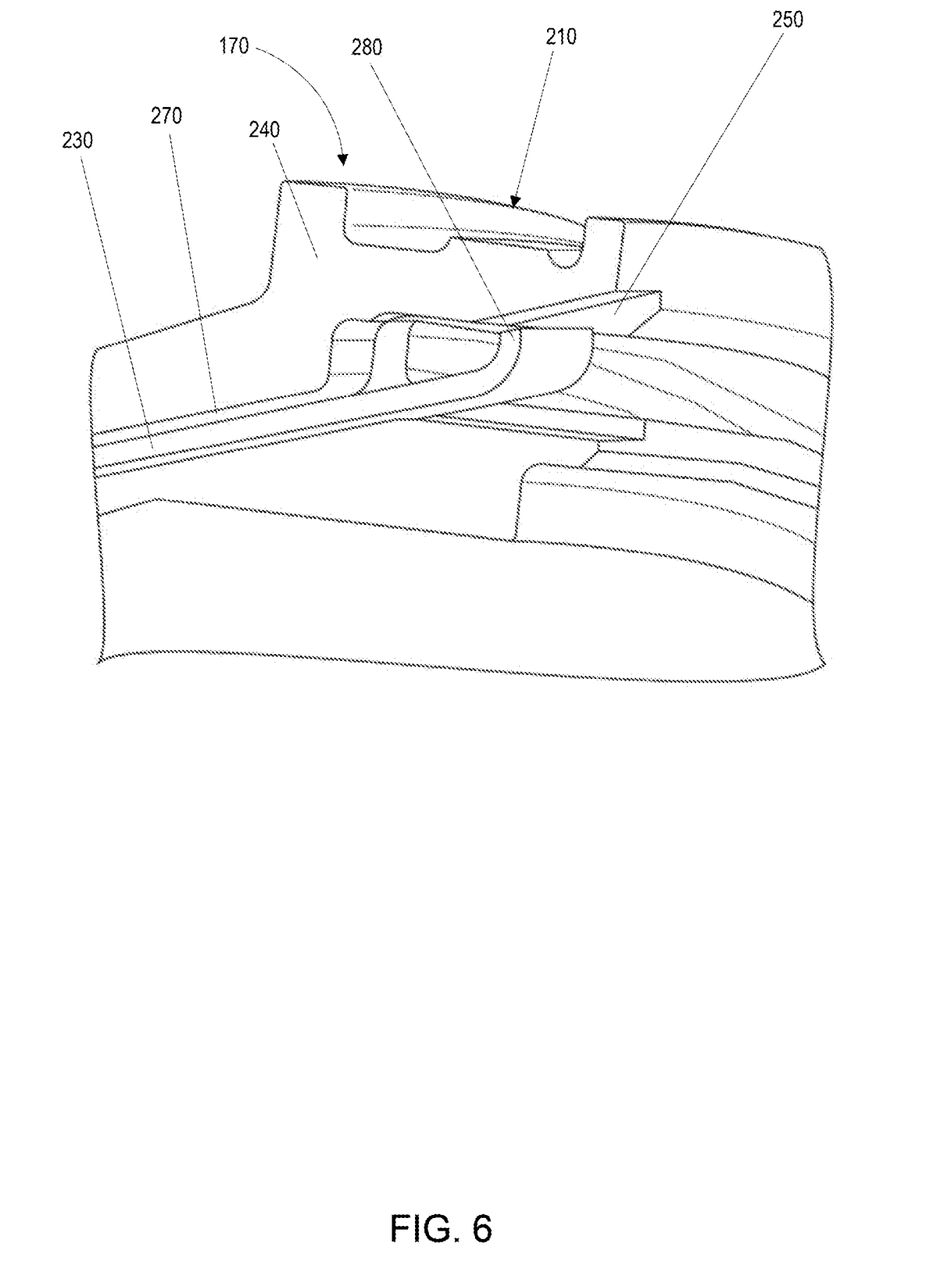
FIG. 6 illustrates a perspective view of a heat shield portion of the gas turbine engine.

FIG. 6 shows a perspective view of the heat shield portion 170 of the gas turbine engine 100. As explained above, and as shown in FIG. 6, the assembly groove 250 may have a polygonal cross section. In some examples, and as shown in FIG. 6, the lip 280 of the inter-segment strip seal 230 may abut and/or slide through the assembly groove 250 when installed in the cavity 270. The lip 280 may be a means to extract the inter-segment strip seal 230 from the cavity 270 in response to a desire to replace or repair the inter-segment strip seal 230.

Figure 7:
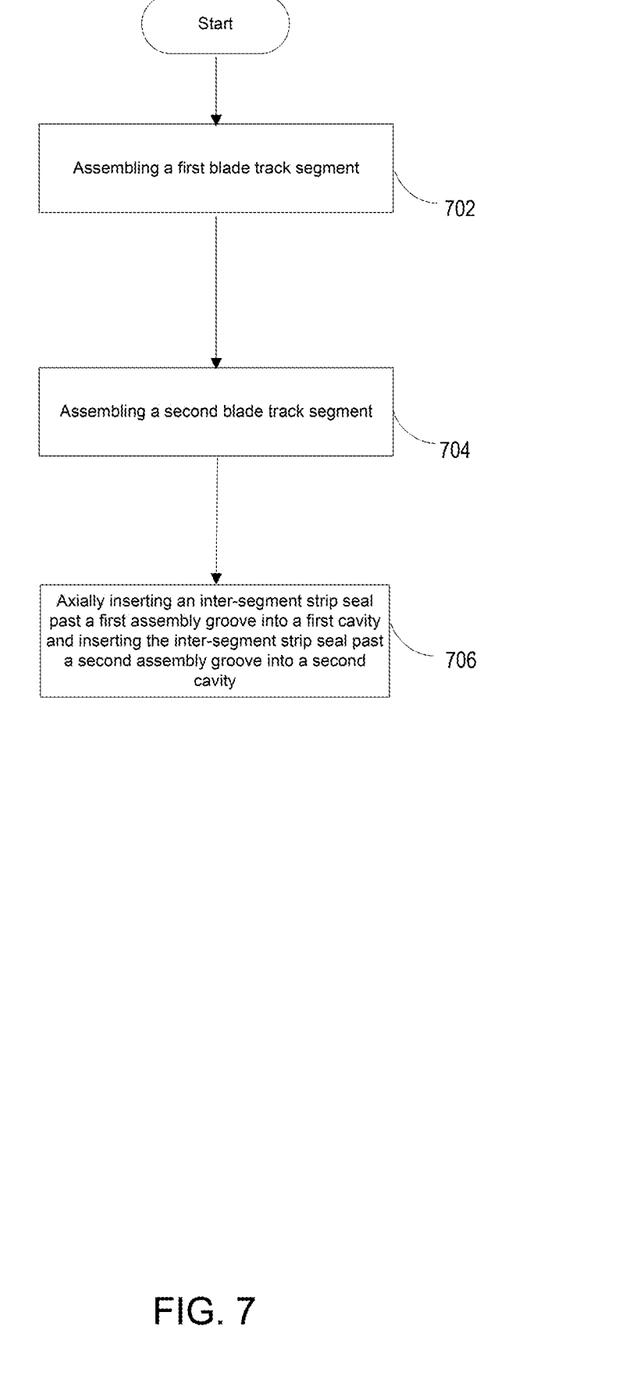
FIG. 7 illustrates a flow diagram of a method for assembling an apparatus that reduces a turbine casing's exposure to heat.

FIG. 7 shows a flow chart of a method for assembling the blade track segments 210 with the inter-segment strip seal 230 spanning the gap 220 between adjacent blade track segments 210. The method may include assembling a first blade track segment 210 (702) including a first assembly groove 250. The first assembly groove 250 may be configured to provide a clearance for axial insertion of the inter-segment strip seal 230 into a first cavity 270. Alternatively or in addition, the method may include assembling a second black track segment 210 including a second cavity 270 and a second assembly groove 250 (704). The second assembly groove 250 may be configured to provide a clearance for axial insertion of the inter-segment strip seal 230 into the second cavity 270. In addition, the method may end, for example, by axially inserting the inter-segment strip seal past the first assembly groove 250 and past the second assembly groove 250 into the first cavity 270 and the second cavity 270 (706).

The method may include additional, fewer, or different steps than illustrated in FIG. 7. In some examples, the method may include coupling the blade track segments 210 to the turbine casing 510. Alternatively or in addition, the method may include coupling the blade track segments 210 to the turbine casing 510 with the clip 520 and the clip 520 may partially or completely surround the assembly groove 250. Alternatively or in addition, the method may include a third blade track segment 210 including a third cavity 270 and a third assembly groove 250 configured to provide a clearance and a fourth blade track segment 210 including a fourth cavity 270 and a fourth assembly groove 250 configured to provide a clearance. The second inter-segment strip seal 230 may be axially inserted past the third assembly groove 250 into the third cavity 270 and the second inter-segment strip seal 230 may be axially inserted past the fourth assembly groove 250 into the fourth cavity 270.

Alternatively or in addition, the method may include installing the second blade track segment to leave a gap between the first blade track segment and the second blade track segment. Alternatively or in addition, the method may include inserting the inter-segment strip seal to cover the gap between the adjacent blade track segments.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. An apparatus comprising:
    a blade track segment for a gas turbine engine including:
        a front end;
        a rear end downstream of the front end;
        a cavity within the blade track segment having an opening at the rear end for axial insertion of an inter-segment strip seal;
        an overhanging portion at the rear end, the overhanging portion disposed radially outward from the cavity and extending along an axial direction downstream of the opening; and
        an assembly groove in the overhanging portion of the blade track segment, wherein the assembly groove is configured to provide a clearance for the axial insertion of the inter-segment strip seal into the cavity.

2. The apparatus of claim 1, wherein the assembly groove has a polygonal cross-section.

3. The apparatus of claim 1, wherein the assembly groove has a rectangular cross-section.

4. The apparatus of claim 1, wherein the assembly groove has a trapezoidal cross-section.

5. The apparatus of claim 1, wherein the assembly groove has a triangular cross-section.

6. The apparatus of claim 1, wherein the assembly groove has a non-polygonal cross-section.

7. A system comprising:
    a first blade track segment for a gas turbine engine including:
        a first front end;
        a first rear end downstream of the first front end;
        a first cavity within the first blade track segment having a first opening at the first rear end for axial insertion of an inter-segment strip seal;
        a first overhanging portion at the first rear end, the first overhanging portion disposed radially outward from the first cavity and extending along an axial direction downstream of the first opening; and
        a first assembly groove in the first overhanging portion of the first blade track segment, the first assembly groove configured to provide a first clearance for the axial insertion of the inter-segment strip seal into the first cavity; and
    a second blade track segment for the gas turbine engine including:
        a second front end;
        a second rear end downstream of the second front end;
        a second cavity within the second blade track segment having a second opening at the second rear end for axial insertion of the inter-segment strip seal;
        a second overhanging portion at the second rear end, the second overhanging portion disposed radially outward from the second cavity and extending along the axial direction downstream of the second opening; and
        a second assembly groove in the second overhanging portion of the second blade track segment, the second assembly groove configured to provide a second clearance for the axial insertion of the inter-segment strip seal into the second cavity, and the first cavity being circumferentially adjacent to the second cavity.

8. The system of claim 7, wherein a first portion of the inter-segment strip seal is in the first cavity and a second portion of the inter-segment strip seal is in the second cavity.

9. The system of claim 8, wherein the first blade track segment and the second blade track segment are circumferentially separated by a gap, wherein the inter-segment strip seal covers the gap.

10. The system of claim 8, wherein the inter-segment strip seal comprises a lip extending from an end of the inter-segment strip seal.

11. The system of claim 10, wherein the lip extends in a curved arc from the end of the inter-segment strip seal.

12. The system of claim 7, further comprising a turbine blade assembly housed within a turbine casing, the first blade track segment and the second blade track segment coupled to the turbine casing, the first blade track segment and the second blade track segment housed within the turbine casing, the turbine blade assembly including an axis of rotation, and wherein an angle between a centerline axis of the first cavity and the axis of rotation is between 0 degrees and 90 degrees, inclusively, and the angle opens toward an exhaust section of the gas turbine engine.

13. The system of claim 12, wherein the first blade track segment is coupled to the turbine casing by a first clip, and wherein a first portion of the clip is positioned further from the axis of rotation of the turbine blade assembly than the first assembly groove and a second portion of the clip is positioned closer to the axis of rotation of the turbine blade assembly than the first assembly groove.

14. The system of claim 13, wherein the clip is positioned adjacent to the assembly groove.

15. The system of claim 7, wherein the first assembly groove is aligned with the second assembly groove.

16. A method comprising:
    assembling a first blade track segment for a gas turbine engine, the first blade track segment including:
        a first front end;
        a first rear end downstream of the first front end;
        a first cavity within the first blade track segment having a first opening at the first rear end for axial insertion of an inter-segment strip seal;
        a first overhanging portion at the first rear end, the first overhanging portion disposed radially outward from the first cavity and extending along an axial direction downstream of the first opening; and
        a first assembly groove in the first overhanging portion of the first blade track segment, the first assembly groove configured to provide a first clearance for the axial insertion of the inter-segment strip seal into the first cavity;

assembling a second blade track segment for the gas turbine engine, the second blade track segment including:
  a second front end;
  a second rear end downstream of the first front end;
  a second cavity within the second blade track segment having a second opening at the second rear end for axial insertion of the inter-segment strip seal;
  a second overhanging portion at the second rear end, the second overhanging portion disposed radially outward from the second cavity and extending along the axial direction downstream of the second opening; and
  a second assembly groove in the second overhanging portion of the second blade track segment, the second assembly groove configured to provide a second clearance for axial insertion of the inter-segment strip seal into the second cavity; and
axially inserting the inter-segment strip seal past the first assembly groove and past the second assembly groove into the first cavity and the second cavity.

17. The method of claim 16, further comprising coupling the first blade track segment to a turbine casing and coupling the second blade track segment to the turbine casing.

18. The method of claim 16, further comprising coupling the first blade track segment to a turbine casing with a clip, the clip positioned to partially surround the assembly groove.

\* \* \* \* \*